US011048993B2

(12) United States Patent
Lowe

(10) Patent No.: US 11,048,993 B2
(45) Date of Patent: Jun. 29, 2021

(54) CARD WITH DYNAMIC SHAPE MEMORY ALLOY TACTILE FEATURE

(71) Applicant: COMPOSECURE, LLC, Somerset, NJ (US)

(72) Inventor: Adam Lowe, Somerset, NJ (US)

(73) Assignee: COMPOSECURE, LLC, Somerset, NJ (US)

( * ) Notice: Subject to any disclaimer, the term of this patent is extended or adjusted under 35 U.S.C. 154(b) by 0 days.

(21) Appl. No.: 16/639,329

(22) PCT Filed: Aug. 14, 2018

(86) PCT No.: PCT/US2018/046608
§ 371 (c)(1),
(2) Date: Feb. 14, 2020

(87) PCT Pub. No.: WO2019/036412
PCT Pub. Date: Feb. 21, 2019

(65) Prior Publication Data
US 2021/0027129 A1    Jan. 28, 2021

Related U.S. Application Data

(60) Provisional application No. 62/545,630, filed on Aug. 15, 2017.

(51) Int. Cl.
*G06K 19/077* (2006.01)
*G06K 19/07* (2006.01)
(52) U.S. Cl.
CPC ..... *G06K 19/0772* (2013.01); *G06K 19/0702* (2013.01)

(58) Field of Classification Search
CPC .......... G06K 19/0772; G06K 19/0702; G06K 19/077; G06K 19/07715; G06K 19/02
See application file for complete search history.

(56) References Cited

U.S. PATENT DOCUMENTS

| 5,412,192 A | 5/1995 | Hoss |
| 9,805,299 B2 | 10/2017 | Viala et al. |
| 2006/0289657 A1 | 12/2006 | Rosenberg |
| 2009/0050693 A1* | 2/2009 | Clegg ............... B42D 25/22 235/380 |

(Continued)

FOREIGN PATENT DOCUMENTS

| EP | 3107044 A1 | 12/2016 |
| WO | 2008124335 A1 | 10/2008 |
| WO | 2015047364 A1 | 4/2015 |

OTHER PUBLICATIONS

International Preliminary Report on Patentability for International Application No. PCT/US2018/046608, dated Feb. 18, 2020, 6 pages.

(Continued)

Primary Examiner — Matthew Mikels
(74) Attorney, Agent, or Firm — RatnerPrestia

(57) ABSTRACT

A transaction or identification card has a width, a length, and at least one planar surface extending across the width and length. The card includes a dynamic feature including an actuator having an inactivated position and an activated position, wherein the inactivated position has at least one reversible difference from the inactivated position relative to the planar surface of the card.

15 Claims, 2 Drawing Sheets

(56) References Cited

U.S. PATENT DOCUMENTS

2015/0339564 A1* 11/2015 Herslow .................. B32B 9/02
235/488

OTHER PUBLICATIONS

International Search Report and Writtenopinion for International, Application No. PCT/US2018/0466 dated Nov. 26, 2018, 9 pages.

* cited by examiner

CARD WITH DYNAMIC SHAPE MEMORY ALLOY TACTILE FEATURE

CROSS REFERENCE TO RELATED APPLICATIONS

This application is a U.S. National Phase Application of PCT International Application PCT/US2018/046608, filed Aug. 14, 2018, which is related to, and claims the benefit of priority to, U.S. Provisional Application No. 62/545,630 filed on 15 Aug. 2017, the contents of which are incorporated herein by reference in their entirety for all purposes.

BACKGROUND OF THE INVENTION

Smart materials are substances that have one or more properties that can be significantly changed in a controlled fashion by varying external factors. Two known smart materials are electroactive polymers and shape memory alloys.

Electroactive polymers (EAP) are a class of materials that change in size or shape when exposed to an electric field. EAPs are commonly classified into two families: ionic EAPs and electronic EAPs. Ionic EAPs are activated by an electrically induced transport of ions and/or molecules. Electronic EAPs are activated by electrostatic forces. Conventional polymers used most often as actuators include poly (vinylidene fluoride) (PVdF)-based polymers, conjugated polymers, and perflourinated ionamers.

A shape memory alloy (SMA) is a material that "remembers" its original shape when deformed. One well-known shape memory material is nitinol (NiTi)—an alloy of nickel and titanium. Nitinol and its properties can be modified to a great extent by changes in its composition, mechanical working, and heat treatment. Certain properties of Nitinol are listed in Table 1. Nitinol is commonly manufactured into sheeting, foil, wire, and tubing. At low temperatures, an SMA, such as nitinol, is in the martensite phase, which is ductile and can be easily deformed. Heating the deformed material above a threshold temperature causes a phase change to austenite, at which the deformation induced at the lower temperature can be recovered.

TABLE 1

Properties of nitinol

| | Austenite | Martensite |
|---|---|---|
| Young's Modulus | 85 GPa | 28-41 GPa[1] |
| Yield Strength | 195-690 MPa | 70-140 MPa |
| Thermal Conductivity | 0.18 W/cm*deg. C. | 0.086 W/cm*deg. C. |
| Ultimate Tensile Strength | 895 MPa (when fully annealed) | |
| Elongation at Failure | 25 to 50% | |
| Density | 6.45 gm/cm$^3$ | |

[1]Nonlinear with temperature

Actuators comprising SMA materials may have a one-way effect or a two-way effect. An SMA actuator with a one-way effect can recover a deformation when heated to austenite, but retains that shape when cooled to martensitic. An SMA with a two-way effect has two stable shapes—one in the austenite phase and the other in the martensitic phase—and does not require an external force to re-deform the material once it recovers its shape.

Nitinol materials may also change color when exposed to heat. The incorporation of nitinol in transaction cards that changes color when heated in response to a stimulus, such as to show that the card is invalid, is described in U.S. Pat. No. 5,412,192, which also describes card embodiments in which locally generated heat causes heat-sensitive plastic to shrink and highlight raised characters on the surface of the card.

There is a need in the field of identification cards and transaction cards, such as credit cards, debit cards, smart cards, and the like, to provide robust, two-way, tactile features. Efforts to provide transaction cards with tactile feedback using EAPs have been documented, such as in U.S. Patent Application Publication No. US20060289657. EAPs are generally not ideal for use in applications that require relatively large displacements in bending motion, fast switching response, low operating voltage, and durable operation. Known ionic EAPs generally have slow actuation response times and relatively minimal displacement under low-voltage operation. While currently known electronic EAPs have very fast response times and high strains, operation voltages in the range of 100 V/μm are currently required.

Thus, there remains a need in the field of transaction and identification cards to provide dynamic features having characteristics not previously offered.

SUMMARY OF THE INVENTION

In one aspect of the invention, a transaction or identification card has a width, a length, at least one planar surface extending across the width and length, and a dynamic feature comprising an actuator having an inactivated position and an activated position, wherein the inactivated position has at least one reversible difference from the inactivated position relative to the planar surface of the card. The at least one difference may be a tactile difference perceptible to human touch. In one embodiment, the dynamic feature has an exposed planar surface that is disposed substantially flush with the at least one planar surface of the card in the inactivated position and offset relative to the at least one planar surface of the card in the activated position. The actuator may be disposed in a cutout in the surface of the card, with a covering over the actuator, wherein the covering lies flush with the at least one planar surface of the card in the inactivated position. The covering may comprise printed indicia, such as a logo corresponding to an issuer or sponsor of the card.

In some embodiments, the dynamic feature comprises a shape memory alloy having the inactivated position in a first material state of the alloy and the activated position in a second material state of the alloy, wherein the first state is different from the second state.

In some embodiments, the card may comprise a circuit comprising the actuator and configured to connect to a power source, the circuit configured to provide sufficient power to the actuator when connected to the power source to cause the actuator to move from the inactivated position to the activated position. In an embodiment in which the dynamic feature comprises a shape memory alloy, the inactivated position may correspond to a relaxed material state of the alloy and the activated position may correspond to a deformed material state of the alloy, wherein the relaxed state is different from the deformed state and the power is sufficient to cause the shape memory alloy to transition from the relaxed state to the deformed state. The power source may comprise a battery embedded in the card; a terminal configured to receive a set of metal contacts, in which the card comprises metal contacts on at least one surface of the card positioned for mating with the terminal; a source of transmitted power, in which the card comprises an antenna configured to receive the transmitted power, such as in an inductive RF circuit; or a combination of any of the foregoing.

In some embodiments, activation or deactivation of the actuator may cause completion of or a discontinuity in an electrical circuit.

In another aspect of the invention, a transaction or identification card has a width, a length, at least one planar surface extending across the width and length, and a dynamic feature comprising a shape memory alloy actuator. The actuator has an inactivated position in a first material state of the alloy and an activated position in a second material state of the alloy, wherein the inactivated position has at least one difference from the inactivated position relative to the planar surface of the card and the first state is different from the second state. The shape memory alloy may comprise an out-of-plane actuator, such as a diaphragm actuator. The shape memory alloy may comprise nickel and titanium, and in some embodiments also copper, and in one embodiment may comprise a sputter-deposited metal alloy on a non-metal film, such as nitinol sputter-deposited on polyimide. The shape memory alloy may comprise a two-way actuator or a one-way actuator.

Another aspect of the invention comprises a process for making a transaction or identification card. One process comprises providing card body having a width, a length, and at least one planar surface extending across the width and length, in which the card has a circuit for receiving power. A pocket is cut in the at least one planar surface, and an actuator is inserted in the pocket and connected to the circuit. The actuator has an inactivated first position relative to the planar surface of the card and an activated second position that is different from the inactivated position relative to the planar surface of the card. A covering is disposed over the actuator. In another process, the card comprises a laminated card body with the actuator is laminated into the body, and the pocket is cut in the at least one planar surface to expose the actuator before disposing a covering over the actuator. In either process, the actuator may comprise a shape memory alloy having the inactivated position in a first material state of the alloy and the activated position in a second material state of the alloy, wherein the first state is different from the second state. The actuator may have a planar surface parallel to the planar surface of the card, in which case the step of disposing the covering over the actuator may comprise disposing the covering flush with the planar surface of the card in the inactivated position of the actuator.

Still another aspect of the invention comprises a method of conducting an activity using any of the transaction or identification cards as described herein. The method comprises the steps of providing a transaction card having a circuit for receiving power from a power source and an actuator connected to the circuit and embedded in the card, the actuator having an inactivated first position relative to the planar surface of the card and an activated second position that has at least one reversible difference from the inactivated position relative to the planar surface of the card. The card is coupled to the power source causing sufficient power to be supplied to the actuator to cause the actuator to actuate from the inactivated position to the activated position. The actuator may comprise a shape memory alloy having the inactivated position in a first material state of the alloy and the activated position in a second material state of the alloy, wherein the first state is different from the second state, and the step of providing sufficient power causes the shape memory alloy to deform from the first state to the second state. The sufficient power may cause the shape memory alloy to generate the sufficient heat via electrical resistance.

In an embodiment in which the actuator comprises a two-way shape memory alloy actuator, the method further comprising the step of decoupling the card from the power source, and the shape memory alloy relaxing from the second state back to the first state upon sufficient heat dissipation. Activation of the actuator from the inactivated position to the activated position may cause an out-of-plane deformation of the dynamic feature relative to the surface of the card that fully or partially disables at least one function of the card.

Yet another aspect of the invention comprises a method of conducting an activity using a transaction or identification card as described herein comprising a shape memory alloy actuator connected to the circuit and embedded in the card, the method comprising coupling the card to the power source; and providing sufficient power to the actuator to cause the actuator to actuate from the inactivated position to the activated position by causing the shape memory alloy to deform from the first state to the second state. The actuator may comprises a one-way shape memory alloy actuator, in which case the method further comprising the step of disconnecting the card from the power source and the shape memory alloy remaining in the second state indefinitely.

In any of the foregoing methods of conducting activities, movement of the actuator from the inactivated to the activated position may create a tactile indicator on the surface of the card that is perceptible to human touch. In embodiments comprising a covering over the actuator, the actuator may have a planar surface parallel to the planar surface of the card such that the covering over the actuator is flush with the planar surface of the card in the inactivated position and offset relative to the planar surface of the card in the activated position. Activation of the actuator from the inactivated position to the activated position in any of the foregoing embodiments may connect or break an electrical circuit that enables or disables a function of the card.

DETAILED DESCRIPTION OF THE INVENTION

SMA (e.g. nitinol) actuators ideal for use in card applications preferably comprise thin sheet SMA materials. Various fabrication methods for developing nitinol are known. One common method is casting, which is associated with high temperature melting levels, which may degrade functional properties due to the secondary phase transformations. Casting may require machining, which may be costly for extremely ductile alloys like nitinol, due to tool wear. Another well-known nitinol manufacturing process is powder metallurgy (PM). PM creates near-net-shape parts that require less machining, but may have high porosity and impurities. Additive manufacturing has also been used to create NiTi parts, having properties that vary based on printing method, but in general, may perform better than parts made via casting and powder metallurgy.

Once a nitinol sheet is manufactured, its properties may be adjusted through heat treatment to meet design requirements. The temperature at which nitinol "remembers" its high-temperature form generally can range from 0° C. to 105° C. The shape transformation typically happens over the range of just a few degrees.

The mechanical properties of nitinol can be modified by changing its composition. Some alloys have close to a 50-50 balance of Ni and Ti, but this ratio can be changed to suit the application. Ni-rich nitinol is generally very stable and has a diverse microstructure. This helps stabilize the shape memory behavior and makes it easy for use in bulk materials. Shape memory properties can be further modified by adding elements that are chemically similar to Ni and Ti. For example, replacing some Ni with Cu can improve the actuation response and fatigue properties. The addition of Cu to nitinol also reportedly increases the high temperature strength of this alloy. Cu is also used for this purpose in CuAlNi alloys—another family of shape memory alloys. Advantages of NiTiCu and CuAlNi SMA alloys are the higher operating temperatures of near 200° C.

EXEMPLARY DYNAMIC FEATURES

Figure 1:
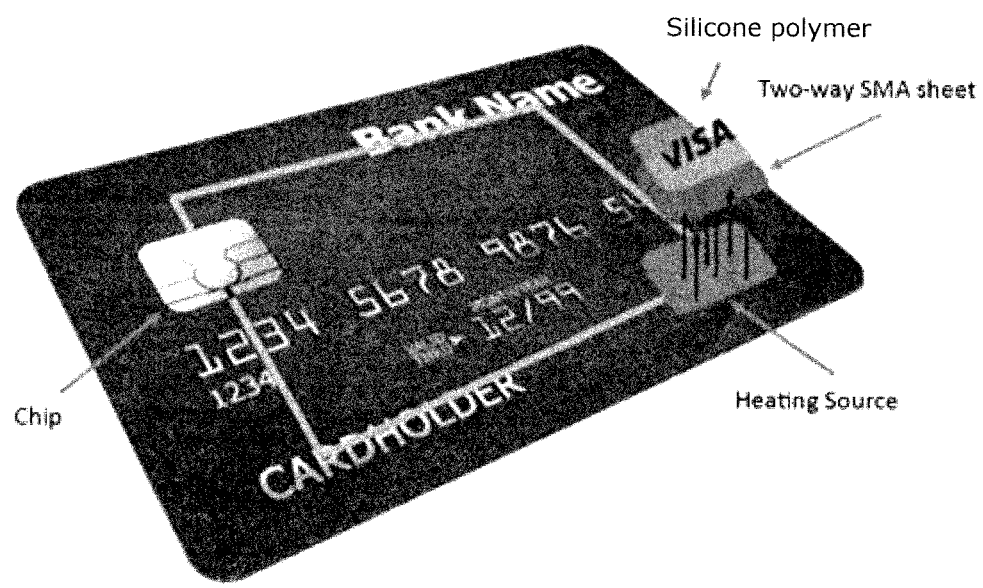
FIG. 1 depicts an exemplary nitinol out-of-plane actuator in an exemplary transaction card.

One exemplary use of an SMA feature in a card may be for creating a printed feature that can rise and lower in different conditions. For example, as shown in FIG. 1, a financial services corporation logo (e.g. Visa, American Express, Citi Bank, Bank of America, etc.) or other similar indicia may rise relative to the plane defined by the surface of the card when the card is inserted into a chip reader. This provides the user with tactile feedback to show when the card has been inserted properly, as well as provide an additional visual feature to emphasize the card brand.

The foregoing feature may be accomplished by using a two-way nitinol SMA actuator activated by "joule heating," which occurs when an electric current passes through a conductor. Current drawn from the point-of-sale terminal when the contacts are inserted into a payment machine flows through the SMA, causing the temperature in the SMA actuator to rise, and activating the memory response of the metal. The SMA actuator may be configured to achieve the desired shape by directionally deforming so that it becomes offset relative to the plane of the card, such as in a manner that causes it to push up or pull down on a flexible portion of a covering layer, such as silicone, over the actuator, so that the covering, or at least a portion thereof in contact with the actuator, is elevated or sunken relative to the plane of the card, respectively.

Figure 3:
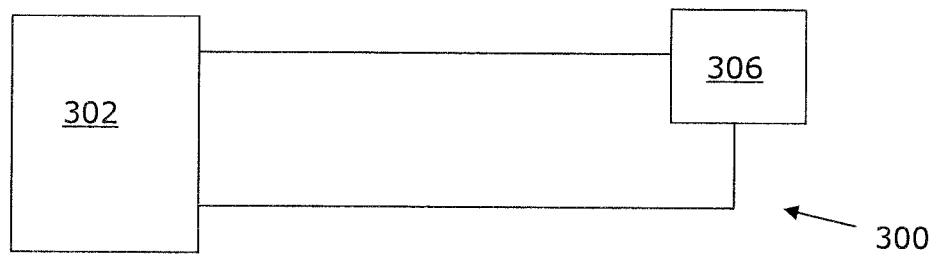
FIG. 3 depicts an exemplary circuit comprising an exemplary dynamic feature.

As illustrated in FIG. 3, the dynamic feature 306 may be part of a circuit 300 coupled to a power source 302 (the coupling may be a physical connection or wireless connection, such as via capacitive or inductive coupling). In embodiments in which the dynamic feature is intended to show a temporary state (such as to signal correct placement in a chip reader), the SMA actuator comprises a two-way SMA actuator that reverts to its relaxed (non-deformed) state as the temperature in the SMA dissipates below the threshold temperature, after disconnection from the power source. The power operative to deform the SMA may be provided by a physical connection, such as with contacts that mate with a POS terminal (such as shown in the embodiment depicted FIG. 1) or other type of chip reader, or by a wireless connection, such as an inductive connection, such as via an inductive RF circuit. In other embodiments, the power source may comprise a battery embedded in the card. Some circuits may include features for receiving power from multiple potential sources (e.g. dual interface circuitry that is capable of receiving power via contacts or inductively, or circuits comprising a battery that is used for providing power assistance when activated via the receipt of power inductively or via the contacts). As shown schematically in FIGS. 3 and 4, power sources 302 and 402 represent the local source of power to the card (e.g. the RFID tag, the contacts, or the battery).

Figure 5:
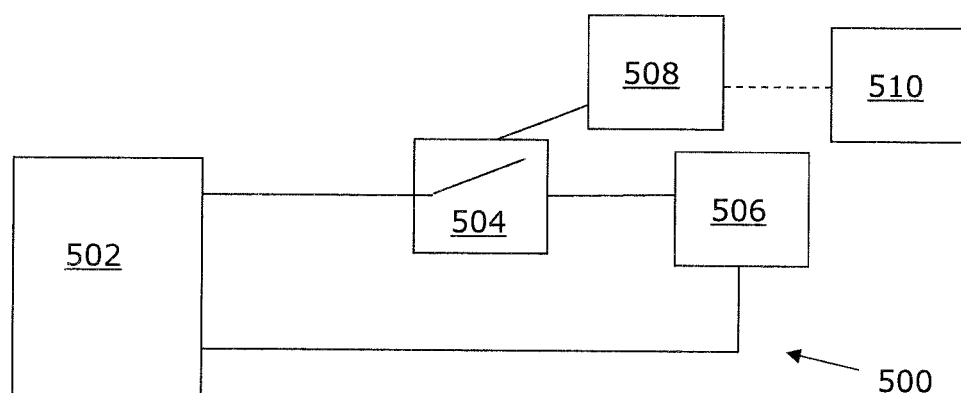
FIG. 5 depicts an exemplary circuit in which a receiver or transceiver in communication with the circuit opens or closes the circuit that actuates the actuator.

In some embodiments, such as in the exemplary embodiment illustrated in FIG. 5, circuit 500 may comprise an RF receiver or transceiver 508, such as a receiver or transceiver configured to communicate via wireless technology, such as short-range wireless technology (e.g. Bluetooth®), such as may be emitted by a mobile device. Thus, in an exemplary embodiments, wireless commands emanating from a transmitter 510, such as a transmitter connected to a computer processor, such as a processor embedded in a cell phone or other mobile device, may be used for providing a signal capable of causing the actuator to actuate from the inactivated to the activated position (and/or vice versa). Although schematically illustrated as a switch 506 in communication with transceiver 508, it should be understood that the switch may be part of the transceiver or the receipt or non-receipt of power from power source 502 may operate as a switch and the transceiver, in circuits in which the receipt of a signal inductively provides the power required to operate the actuator. As is understood in the art, wireless signals transmitted by a transmitter in a mobile device may be controlled by a computer processor embedded in the device in accordance with programmed instructions readable by the processor. As is common in the field of mobile device application software, the instructions may be stored in part on the device and in part "in the cloud" on servers accessible via a wireless network in communication with the device. The application software for controlling the signals as described may include a user interface for permitting a user to instruct emission of the signal and/or may include an interface controlled by a remote source through a network connected to the device.

Figure 4:
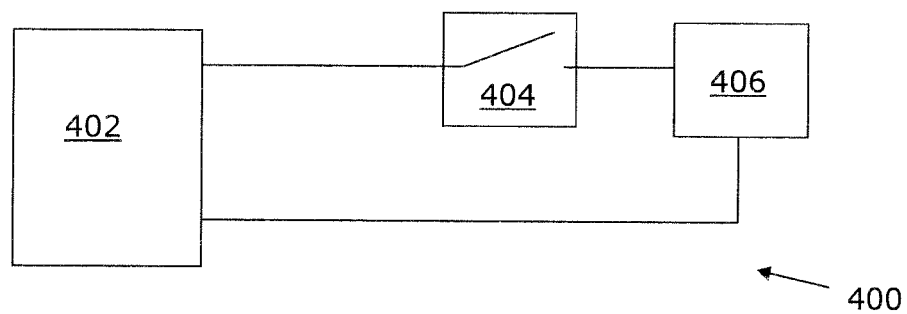
FIG. 4 depicts an exemplary circuit in which a dynamic actuator opens or closes an electrical circuit.

In other embodiments, one or more one-way SMA features may be part of a circuit configured to receive a pulse from the power source for the purposes of causing a one-time deformation. For example, logic in the card reader may be programmed to send a characteristic signal configured to activate a self-destruct circuit when the card has become expired or de-activated because of fraud, and such a one-way feature may be disposed in a location that is sufficiently disruptive to render the card fully or partially inoperative (such as positioned adjacent the contacts for being read by a POS terminal, along the magnetic stripe where the feature renders the card too thick to swipe in a typical card reader or sufficiently disrupts readability of the magnetic strip by a standard reader, in a location where the deformation breaks a connection sufficient to disable an RFID circuit, or in all or some combination of the above). In another embodiment, such circuit 400 illustrated in FIG. 4, dynamic feature 404 may essentially operate as a switch that deforms upon activation by receipt of power from power source 402 to move into a position that creates an electrical connection for activating a functional component 406 (or that breaks an electrical connection for de-activating the functional component). Such a deformation for creating a connection may be formed using a one-way SMA or a two-way SMA, depending upon the functionality desired. Some embodiments may have both two-way and one-way SMA features, which features may be activated in different circumstances, and may have multiple circuits. The schematic circuits shown in FIGS. 3 and 4 are illustrative only, and additional components may be included in each circuit.

Figure 2:
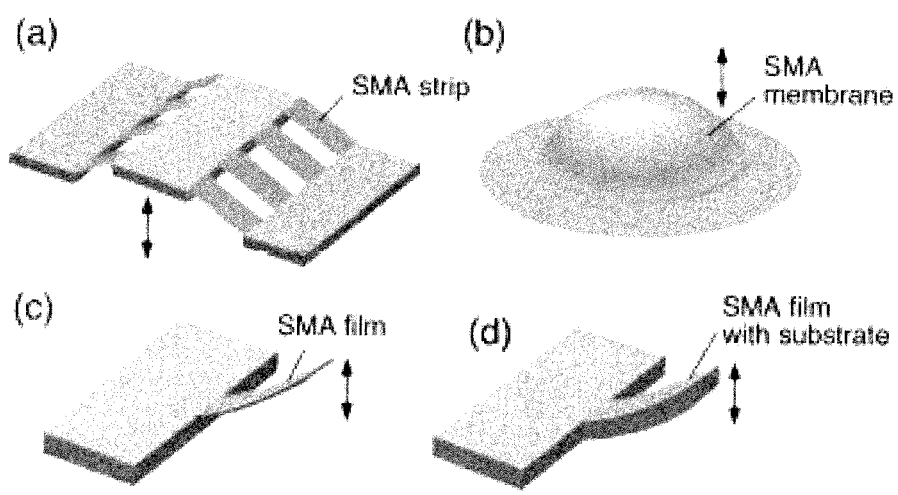
FIG. 2 depicts various exemplary out-of-plane actuators, including (a) a bridge type, (b) a diaphragm type, (c) a free-standing cantilever type, (d) and a bimorph cantilever type.

In preferred two-way actuator embodiments, the SMA actuator is an "out-of-plane" actuator with a displacement normal to the surface of the card. FIG. 2 shows exemplary out-of-plane actuators, including (a) a bridge type, (b) a diaphragm type, (c) a free-standing cantilever type, (d) and a bimorph cantilever type that have so far been reported. While the invention is not limited to the types of actuators depicted, or to any one of those depicted, a diaphragm-type actuator may be highly desirable due to its large force and stroke.

A layer of deformable, flexible surface covering, such as silicone or a plastic sheet material having suitable properties to permit a desired amount of deformation, may be disposed on top of the SMA actuator. While depicted with a printed logo on the covering in FIG. 2, which logo has a visual contrast to the rest of the card, the invention is not limited to any particular indicia on the coating or relative difference in shading or coloration of the covering layer versus the rest of the card. When the SMA actuator is in an inactivated state, the covering is disposed flush with the surface of the card. When the SMA deforms and pushes on the underside of the covering, the covering assumes a desired shape and position relative to the rest of the planar surface of the card. When the stimulus is removed, such as when the card is removed from a reader, the SMA will revert to its original, non-activated shape and the covering will once again lie flush with the planar surface of the card.

Technical Considerations

Nitinol SMAs have a relative high work output per unit volume, as well as a high power/mass ratio. Depending on the thickness of the material, nitinol alloys often have an average frequency response time, large strain output, and joule heating activation. Nitinol alloys are capable of producing a strain output of up to 8 to 10%. One concern when using any material in cyclic motion is fatigue. Studies on the fatigue effects of NiTi show that some alloys have a fatigue limit, but can undergo a nearly unlimited number of cycles, so long as the stress is kept below the fatigue limit. For example, if the strain is kept below 2%, the fatigue life of the actuator can exceed more than a million cycles.

Cards with SMA actuators must generate sufficient current to activate the shape memory effect. The resistivity of NiTi is approximately 90 μΩ*cm. The resistance of a metal may be calculated using Equation 1:

$$R = (\rho * l)/A \quad (1)$$

where ρ is the resistivity, l is the length, and A is the cross-sectional area.

Combining Ohm's law and Joule's law provides Equations 2-4:

$$Q = I^2 R t \quad (2)$$

$$Q = mc\Delta T \quad (3)$$

$$I^2 R t = mc\Delta T \quad (4)$$

where Q is the heat transferred, I is the current through the metal, t is the time the current is flowing, m is the mass, c is the specific heat of the SMA alloy, and ΔT is the change in temperature.

The foregoing equations can be used to determine the amount of time require to achieve a desired temperature change with a given current and/or to determine the current required to produce a given temperature change over a given amount of time.

The actuator requires an actuation force sufficient to cause the covering over the SMA to rise by a desired amount. Insufficient force will prevent the printed logo from rising adequately off of the card. Embodiments comprising sputter-deposited nitinol on a polyimide film may be particularly well suited for maximizing actuation power, although the invention is not limited to any particular material deposited, method of deposition, or type of film. Other suitable non-metal films may include polydimethylsiloxane (PDMS) or any other suitable polymeric organosilicon compound, polymethyl methacrylate (PMMA) or any other suitable synthetic resin, and polyamide, without limitation. Force in such actuators can be calculated using the Equation 5:

$$F = \frac{3E_s I_s}{L^3} d = \frac{E_s b}{4} \left(\frac{t_s}{L}\right)^3 d \quad (5)$$

where $E_s$ is the Young's modulus of elasticity, $I_s$ is the second moment of area, $t_s$ is the thickness of the polyimide substrate, b is the width and L is the length of the cantilever, and d is the displacement of the free edge. Therefore, the force is approximately proportional to the cube of the polyimide thickness in sputter-deposited nitinol over polyimide film actuators.

Preferably, heating the metal sufficiently to activate the SMA is controlled and cannot be activated by the environment, else an uncontrolled environment with a high temperate may cause unintended activation. Heat absorbing and/or dissipating material surrounding the SMA, such as copper, aluminum, or any other material known for its relatively high heat transfer characteristics that make it ideal for use as a heat sink, may be included to absorb environmental heat to minimize heat transferred to the memory alloy.

Nitinol sheeting can be purchased through manufacturers in "untrained" or pre-memory-trained condition. Thus, nitinol actuators may procured ready to be inserted into the cards or "trained" steps may be included as part of the card assembly process.

In one embodiment, a shape memory actuator may be installed in a payment card in a pocket cut into the card via any method known in the art, such as, for example, using similar methods used for creating chip pockets, such as using a CNC machine. The SMA actuator and any covering are then placed in the cutout. The edges of the sheet are secured in the pocket such as by pinning the corners or gluing the edges of the sheet in the pocket.

In another embodiment, the SMA actuator may be added into the build of a card before lamination. Then, a pocket is cut though the top layer of the laminated card to expose the SMA actuator, and the covering layer is placed on top of and adhered to the surface of the SMA actuator. The top layer of the card may comprise any materials, including metal, such as but not limited to stainless steel or any metal known in the art for making a metal card, or plastic.

SMA actuators provide payment card manufacturers with a tool to differentiate themselves from competitors, and provide an end user with tactile feedback, such as to indicate payment. Current drawn through the payment terminal when the chip is inserted flows to the SMA, heating the SMA until it deforms to its pre-determined shape. This pushes up a covering, such as a silicone overlay, over the SMA, to create a raised, tactile pattern relative to the planar surface of the card.

Although discussed extensively with respect to exemplary embodiments herein in the context of SMA actuators, it should be understood that the invention is not limited to the use of SMA actuators, and may feature any type of microscale motion activators, actuators or sensors, including microfluidic devices or devices comprising any types of smart materials known in the art that are suitable for embedding in a transaction card and providing the functionality described herein may be provided. In particular, actuators with reversible motion (capable of repeatedly moving back and forth between the activated and inactivated stats) may be particularly useful in many of the embodiments described herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A transaction or identification card having a width, a length, and at least one planar surface extending across the width and length, the card comprising:
   a dynamic feature comprising an actuator having an inactivated position and an activated position, wherein the inactivated position has at least one reversible difference from the activated position relative to the planar surface of the card; and
   wherein the dynamic feature comprises a shape memory alloy having the inactivated position in a first material state of the alloy and the activated position in a second material state of the alloy, wherein the first state is different from the second state.

2. The transaction card or identification card of claim 1, wherein the at least one difference comprises a tactile difference perceptible to human touch.

3. The transaction or identification card of claim 1, wherein the dynamic feature has an exposed planar surface that is disposed substantially flush with the at least one planar surface of the card in the inactivated position and offset relative to the at least one planar surface of the card in the activated position.

4. The transaction or identification card of claim 3, wherein the dynamic feature comprises the actuator disposed in a cutout in the surface of the card, with a covering over the actuator, wherein the covering lies flush with the at least one planar surface of the card in the inactivated position.

5. The transaction or identification card of claim 4, wherein the covering comprises printed indicia.

6. The transaction or identification card of claim 5, wherein the printed indicia comprises a logo corresponding to an issuer or sponsor of the card.

7. The transaction or identification card of claim 1, wherein the at least one planar surface comprises metal.

8. The transaction or identification card of claim 1, wherein the card comprises a circuit comprising the actuator and configured to connect to a power source, the circuit configured to provide sufficient power to the actuator when connected to the power source to cause the actuator to move from the inactivated position to the activated position.

9. The transaction or identification card of claim 8, wherein the shape memory alloy has the inactivated position in a relaxed material state of the alloy and the activated position in a deformed material state of the alloy, wherein the relaxed state is different from the deformed state and the power is sufficient to cause the shape memory alloy to transition from the relaxed state to the deformed state.

10. The transaction or identification card of claim 8, wherein the power source comprises a battery embedded in the card.

11. The transaction or identification card of claim 8, wherein the power source comprises a terminal configured to receive a set of metal contacts, and the card comprises metal contacts on at least one surface of the card positioned for mating with the terminal.

12. The transaction or identification card of claim 8, wherein the power source comprises transmitted power and the card comprises an antenna configured to receive the transmitted power.

13. The transaction or identification card of claim 12, wherein the circuit comprises an inductive RF circuit.

14. The transaction card of claim 8, further comprising an RF receiver or transceiver configured to receive a signal operable to cause the actuator to actuate.

15. The transaction card of claim 14, wherein the RF receiver or transceiver is configured to receive the signal via short-range wireless technology.

* * * * *